United States Patent Office 2,712,923
Patented July 12, 1955

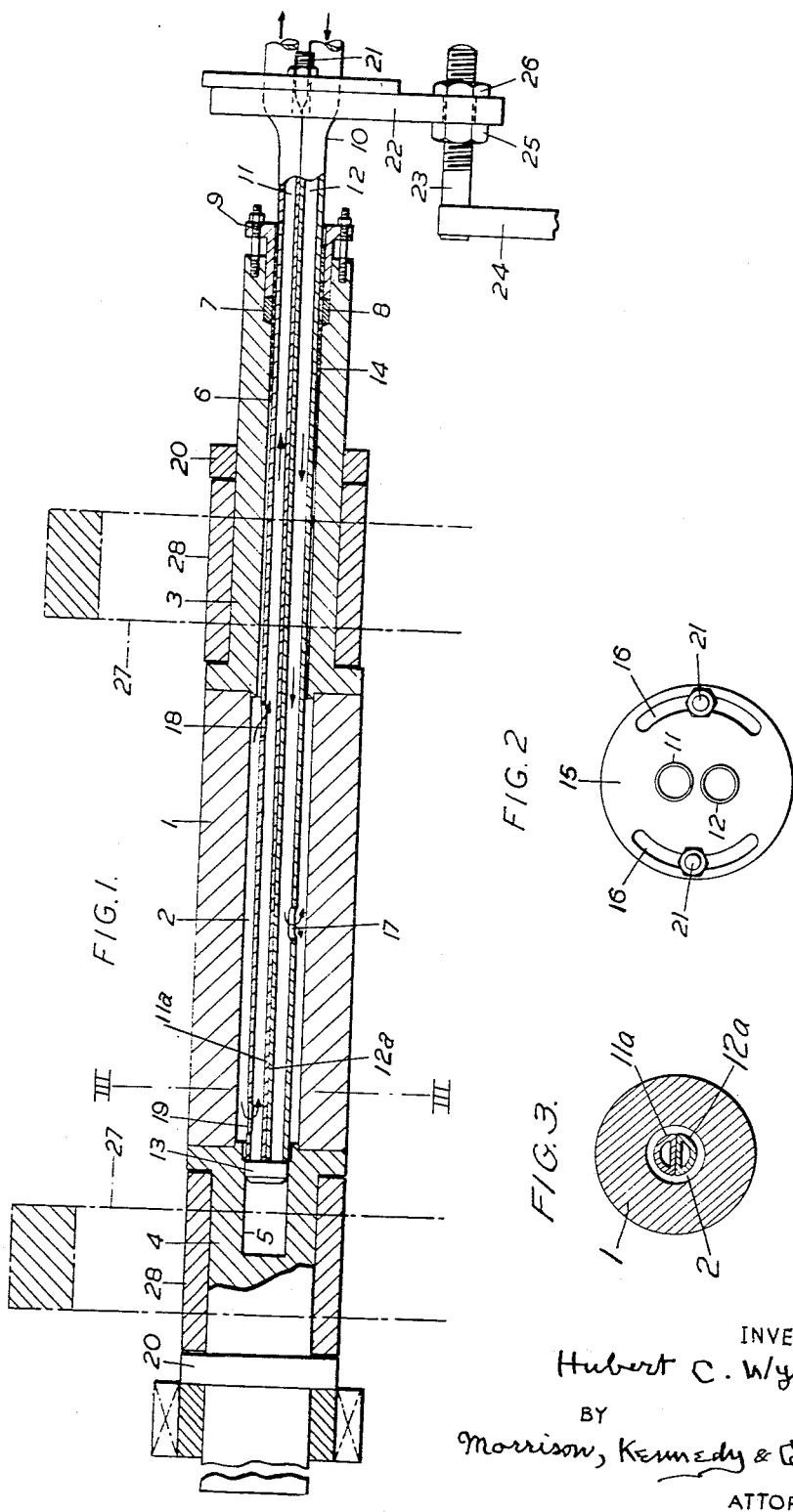

2,712,923
FLUID COOLED ROLL

Hubert Cecil Wynne, Barnby Dun, near Doncaster, England, assignor to Pilkington Brothers Limited, Liverpool, England, a corporation of Great Britain Application January 2, 1952, Serial No. 264,424

7 Claims. (Cl. 257—95)

This invention relates to methods and means of producing a continuous ribbon of glass.

In the manufacture of glass in continuous ribbon form the stream of glass issuing from a tank or other supply of molten glass, for example, a refining chamber or forehearth flows to a rolling apparatus. The latter may consist either of a pair of rollers or a roller operating with a travelling table, the molten glass being allowed to flow between the pair of rollers or between the roller and the travelling table as the case may be.

The rollers, known as sizing rollers, employed in such apparatus are made of steel or iron and are subjected to a high temperature (e. g. 1,100° C.) by contact with the molten glass ribbon. In order to prevent distortion or deterioration of the rollers and to maintain them at a suitable temperature for forming the glass ribbon, a cooling liquid is pumped straight through the rollers. To effect such cooling a very large volume of cooling liquid, about 240,000 gallons per roller in 24 hours, is pumped straight through the roller to bring about the necessary amount of heat exchange to endeavor to maintain the roller at a desirable temperature. It has, however, been proposed to reduce the amount of cooling liquid used by providing in the roller a tubular member having near to the water inlet and outlet of the roller, conical end caps, so that the water is directed to the annular space formed between the roller and the tubular member, through which the liquid flows.

Since however, in either case the cooling liquid enters at one end of the roller and leaves at the other, the temperature of the roller is lower at the inlet end than at the outlet end, assuming that the roller has the same wall thickness throughout, in other words is a symmetrical roller.

To compensate for the differences in temperature in order to attempt to obtain symmetrical cooling, elaborate contours in the bore of the roller have been quite usual, but even so in practice the centre of the roller attains the highest temperature. The differences between the centre and the end of the roller, frequently are as great as 150° C., and these differences are responsible for different rates of external scaling and accordingly loss of external contour.

If the water cooling is insufficient the roller alters in shape with detrimental effect to the uniformity of the thickness of the ribbon being produced; and with continued insufficiency of cooling, the rollers become overheated, causing adhesion of the ribbon to the rollers. The latter incident immediately interferes with the parting of the glass from the rollers; and defects may be caused in the ribbon, by reason of glass adhering to the rollers.

To eliminate this detrimental effect on production, the supply of glass to the rollers must be cut off whilst a new roller is substituted, which operation interrupts the production of good glass for about 12 hours.

The main object of the invention is to obtain more symmetrical cooling of glass sizing rollers with the greatest cooling effect at the central portion of the roller, and at the same time to prevent the formation of a flow of cooling fluid through the roller which does not do useful work.

A further main object is to effect balancing of temperatures at each end of the roller during working, whilst employing a roller of symmetrical contour.

Another object is to achieve economy in the great cost of cooling the rollers.

A method of cooling a sizing roller, used in the manufacture of ribbon glass, according to the present invention consists in downwardly delivering a continuous stream of a cooling liquid in contiguity with the wall at the lower part of the bore at the central area only of the roller, constraining the entering liquid to divide and flow to opposite ends of the bore as a lining therefor and extracting the fluid in contiguity with the upper part of the wall of the bore at two points one towards each end thereof the two points being diametrically opposite to the delivery point and above the level thereof so as to continuously move the liquid lining to the bore.

By such a method of obtaining a divided cooling flow symmetrical cooling is effected.

In order to balance the temperature at the two ends of the rollers, should variations occur, the volume of flow in one division of the liquid stream may be varied as compared with the flow in the other, and such variation may be achieved by throttling the flow through the exit aperture adjacent to the area of lower temperature.

The present invention also comprises a sizing roller, for the use in the manufacture of a ribbon of glass, characterised by a tubular member located coaxially within the bore of the roller and sealed at the inner end, the said tubular member defining with the wall of the roller an annular space, said tubular member being apertured to provide a delivery point for cooling liquid directed into the annular space towards the lower part of the bore of the roller in the middle region only thereof, and two outlet points from the annular space, one near each end region of the roller directed towards the upper part of the bore of the roller, the said tubular member being partitioned symmetrically in an axial direction between the delivery and outlet points, a cooling water connection member attached to the tubular member at the outer end above and below the partition, whereby substantially the whole volume of liquid delivered into the tubular member effects a heat exchange with the wall of the roller, and means for restraining the tubular member against rotating with the roller.

The tubular member is preferably displaceable axially within the roller so as to vary the effective area of the respective outlet apertures available to the liquid, the one with respect to the other, and thereby balance the temperatures during the operation of the roller.

The tubular member is conveniently constituted by securing together two D tubes with their flat faces in contiguity, the flat faces forming a diametrical partition across the tubular member of which the diameter is equal to twice the depth of each D tube.

In one form of the invention a tubular member divided into two semi-cylindrical portions by a diametrical wall running its whole length may be arranged in the bore of the roller, one of the resulting D-shaped passages being provided with an opening or openings in the curved wall so positioned as to be substantially half-way along the bore of the roller, and the other D-shaped passage being provided with an opening or openings in its curved wall at positions spaced by substantially half the length of the roller on each side of the opening or openings in the other D-shaped passage. The tubular member is supported in bores in the trunnion ends supporting the roller and is of such external diameter as to leave a relatively small annular space between the roller bore for the flow of cooling liquid and the tubular member. The inner ends of the D-shaped passages are sealed within the respective bore.

A preferred form of the invention will now be described reference being made to the accompanying drawing in which Fig. 1 is a sectional view of a sizing roller according to the invention, Fig. 2 is a end elevation of Fig. 1, and Figure 3 is a cross section taken at the line III—III of Figure 1.

A cast iron roller 1 with a central bore 2 having a diameter a little more than a third of the roller is provided with supporting trunnions 3, 4 at each end, which trunnions may be of mild steel. One trunnion 4 is provided with an axial cylindrical recess 5 approximating in diameter to one third of the diameter of the roller. The other trunnion 3 is bored throughout its length, the bore 6 being somewhat larger in diameter than the recess 5 for the greater part of its length and being stepped up at the outer end at 7 to receive packing 8 and a gland 9.

Extending through the bored trunnion 3 and the roller 1 and entering the recess 5 of the trunnion 4 is a composite cylindrical member 10, formed of two D-shaped tubes 11, 12 brazed together at their flat faces 11a and 12a respectively so as to form a diametrical partition for the member 10 which latter is held against rotation with the roller as hereinafter described.

The inner end of the member 10 is sealed by a bronze cap 13 which may be self-lubricating and is a sliding fit in the trunnion recess 5. Towards the other end of the member 10 there is attached a bronze sleeve 14 which is a sliding fit in the trunnion bore 6 and may be self-lubricating, the sleeve extending over the stepped portion 7 of the bore and a short way into the bore 6 of the trunnion 3.

At the exposed end of the member 10 the D tubes 11, 12 are separate and pass through bores in a torque plate 15 which, to retain the member 10 against rotation with roller 1, carries arcuate slots 16 to facilitate positioning the plate 15 (by studs 21 carried by a plate 22) with the flat faces of the tubes at a desired angle to the horizontal.

The plate 22 is attached to a stud 23 by nuts 25 and 26, stud 23 being carried by a fixed portion 24 of the roller support. The lower of the two D tubes 12 is provided with a central orifice 17 in its cylindrical wall, the orifice being so positioned that it is about half way along the bore of the roller; and the upper D tube 11 is provided with two apertures or orifices 18 and 19, one towards each end of the roller bore. The D tube 12 is the inlet conduit for cooling liquid and D tube 11 the outlet conduit. Hence the cold cooling liquid follows a natural thermosyphon as it is warmed by contact with the wall of the bore. The trunnions 3 and 4 may be provided with steel collars 20 to limit axial movement of the roller 1 in operation.

In using the roller described, hoses may be attached to tubes 12, 11 carried by the torque plate 15 for the supply and discharge of cooling water, which flows into the lower D tube 12 and from its aperture or orifice 17 into the centre of the bore 2 of the roller 1. The water will then divide, flow in controlled paths towards the two ends of the roller bore and enter the apertures or orifices 18 and 19 in upper D tube 11 and so pass to the discharge hose.

The amount of water leaving the apertures or orifices 18 and 19 in upper D tube may be controlled by axial displacement of the member 10, by adjustment of nuts 25 and 26 on stud 23 which effects a regulation of the effective area of each aperture, the orifice at one end or the other being partly masked by entering the trunnion bore 6 or recess 5 and varied in effective area with respect to the effective area of the other; thus the temperatures at the two ends of roller 1 may be balanced during working.

In the construction described the apertures 18 and 19 preferably are equal in area and each substantially half of the area of aperture 17. The two exit apertures 18 and 19 may however have considerably more each than half the area of the inlet aperture, and when the D tube members are in their central, i. e. symmetrical position, these exit apertures extend into the bores of the trunnions so as to be restricted effectively so that each has substantially half the area of the inlet aperture. Moving the D tube member would then increase the one exit aperture to more than half of the inlet aperture area and decrease the other exit aperture.

By means of the invention it is possible to balance the temperature of the roller and allow of a symmetrical contour thereof being employed; water supply and discharge are confined to one end only of the roller leaving the other free for the drive, and the water consumption may be considerably reduced as compared with the quantities previously employed since the annulus of water may be maintained of small thickness and more efficient heat exchange obtained. Water consumption may be reduced from 10,000 gallons per hour to 3,000 gallons per hour for plate glass rollers. In addition, air or steam tending to collect in the roller bore will be readily carried away through the orifices of the upper D tube, the provision of air bleed pipes as in rollers hitherto used being unnecessary in the rollers of the invention.

By providing an annular passage between the hollow member of the wall of the roller and the supply and discharge apertures in the tubular member as described, a more efficient use of water is achieved than has heretofore been obtained by reason of controlling the temperature and cooling effects at the two ends of the roller, and by reason of the higher ranges of water temperature which are consequently permitted. The provision of the aperture slots moreover assures a turbulence in the flow along the wall of the roller and thereby attains efficient cooling of the wall.

The tubular member may be of a composite nature comprising end walls connected by a copper tube provided with a partition and slotted as heretofore explained.

In Fig. 1 the usual supporting frames for the sizing rollers are indicated at 27. In these frames there are located the bearings 28 in which the trunnions 3 and 4 rotate.

I claim:
1. A sizing roller for use in the manufacture of a ribbon of glass from molten glass having a tubular member located coaxially within the bore of the roller and sealed at the inner end, said tubular member defining with the wall of the roller an annular space said tubular member being apertured in its area opposed to the middle region of the roller only on the underside thereof to provide a delivery point for all the cooling liquid entering the annular space directed towards the lower part of the bore of the roller and two outlet points from the annular space for the cooling liquid one near each end region of the roller directed towards the upper part of the bore of the roller, the said tubular member being partitioned symmetrically in an axial direction between the delivery and outlet points, a cooling water connection member attached to the tubular member at the outer end above and below the partition, whereby substantially the whole volume of the liquid delivered into the tubular member effects a heat exchange with the wall of the roller, and means for restraining the tubular member against rotating with the roller.

2. A sizing roller according to claim 1 wherein the tubular member is axially displaceable within the roller so as to vary the effective area of the respective outlet apertures available to the liquid, the one with respect to the other, and thereby balance the temperatures during operation of the roller.

3. A sizing roller for use in the manufacture from molten glass of a ribbon of glass, comprising a central hollow bored cylindrical section having trunnions at each end thereof, an axial cylindrical recess in one of the said trunnions and a cylindrical bore through the other trunnion, a tubular member extending coaxially through the bore in the trunnion and entering the said recess, the tubular member defining with the roller wall an annular space, the said tubular member being partitioned to constitute a double conduit sealed at the inner end, a lower one of said conduits being apertured only in the middle region of the central cylindrical section to deliver all cooling fluid used into the annular space and against the wall in the lower part of the bore of the roller, the upper conduit being apertured only towards each end of the said cylindrical section to form the outlets from the annular space for the cooling fluid, gland means to prevent escape of cooling fluid along the trunnion bore, a cooling water connection member attached to the outer end of each conduit, and means to restrain the tubular member from rotating with the roller.

4. A sizing roller for use in the manufacture from molten glass of a ribbon of glass, comprising a central hollow bored cylindrical section, a trunnion at each end of the said section, an axial cylindrical recess in one of the trunnions, and an axial cylindrical bore through the other trunnion, a tubular member extending through the trunnion bore and into the said recess, the tubular member defining with the roller wall an annular space the said tubular member being virtually partitioned by being constituted by two similar tubes of D cross-section connected flat to flat and sealed within the recess, the semi-cylindrical face only of a lower one of the D tubes being apertured in the middle region of the central cylindrical section of the roller to deliver all cooling liquid used into the lower part of the annular space, the curved face only of the upper D tube having two apertures, one towards each end of the central cylindrical section of the roller to constitute the outlets from the annular space for the cooling liquid, gland means to prevent escape of fluid from the roller through the trunnion bore, a cooling water connection member attached to the outer end of each D tube, and means to restrain the tubular member from rotating with the roller.

5. A sizing roller according to claim 4 wherein the tubular member is provided at its outer end with a plate through which the two tubes pass, the said plate carrying slots for attachment to a further plate which is adjustable in position in the direction of the axis of the sizing roller to vary the effective area of the apertures positioned towards the ends of the central cylindrical section of the roller.

6. A sizing roller for use in the manufacture of a ribbon of glass from molten glass comprising a central hollow bored cylindrical section, a trunnion at each end of the said section, an axial cylindrical recess in one of the trunnions and an axial bore through the other trunnion, a tubular member extending coaxially through the trunnion bore and into the said recess, said tubular member being partitioned to constitute a double conduit the conduit being sealed within the recess the tubular member defining with the roller wall an annular space, a lower one of said conduits being apertured only in the middle region of the central cylindrical section of the roller, to deliver all cooling liquid used into the lower part of the annular space the upper conduit having two apertures only one towards each end of the cylindrical section of the roller to constitute the outlets from the annular space for the cooling liquid both outlets being on a part of the tubular member substantially diametrically opposite to the first mentioned aperture, gland means to prevent escape of fluid from the roller through the trunnion bore, a cooling water connection member attached to the outer end of each conduit, and a plate attached to the conduits, arcuate slots in the plate for attachment thereof to a further plate which is restrained from rotation with the roller, the arcuate slots permitting of partial rotation of the cylindrical member to position the apertures.

7. A sizing roller according to claim 6 wherein the said further plate is arranged for adjustment in a direction to move the tubular member into or out of the roller whereby to vary the effective area of the apertures positioned towards the ends of the central cylindrical section of the roller.

References Cited in the file of this patent

UNITED STATES PATENTS

| Number | Name | Date |
|---|---|---|
| 996,657 | McGregor | July 4, 1911 |
| 1,307,160 | Stokes | June 17, 1919 |
| 1,657,212 | Hitchcock | Jan. 24, 1928 |
| 1,692,569 | Reece | Nov. 20, 1928 |
| 1,894,618 | King | Jan. 17, 1933 |
| 2,300,528 | Sherts | Nov. 3, 1942 |